Jan. 4, 1938.　　　　G. F. HURT　　　　2,104,040
REFUSE INCINERATION
Filed Aug. 27, 1934　　　3 Sheets-Sheet 1
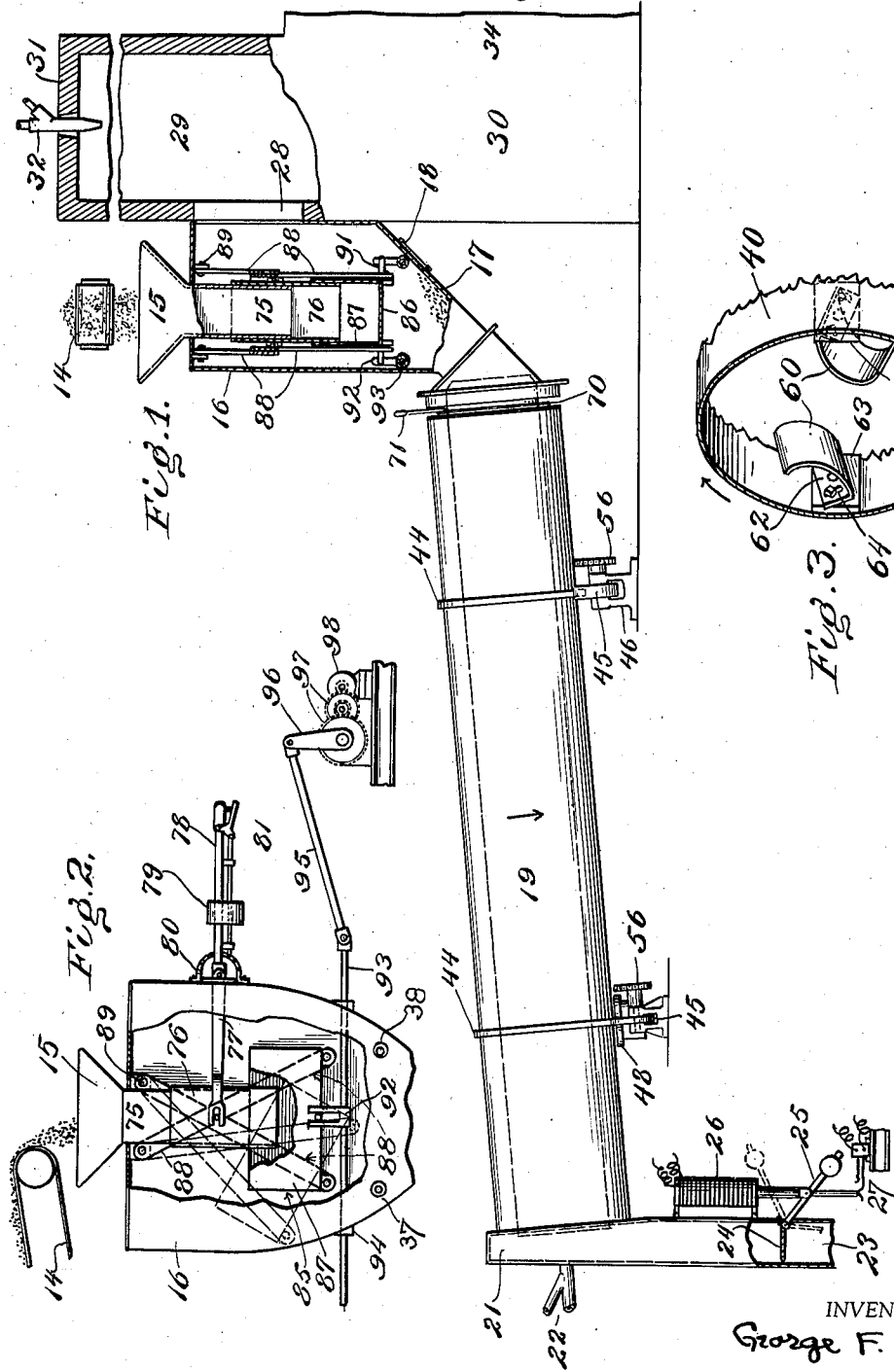
INVENTOR:
George F. Hurt
BY Morrison, Kennedy
 + Campbell
　　　ATTORNEYS.

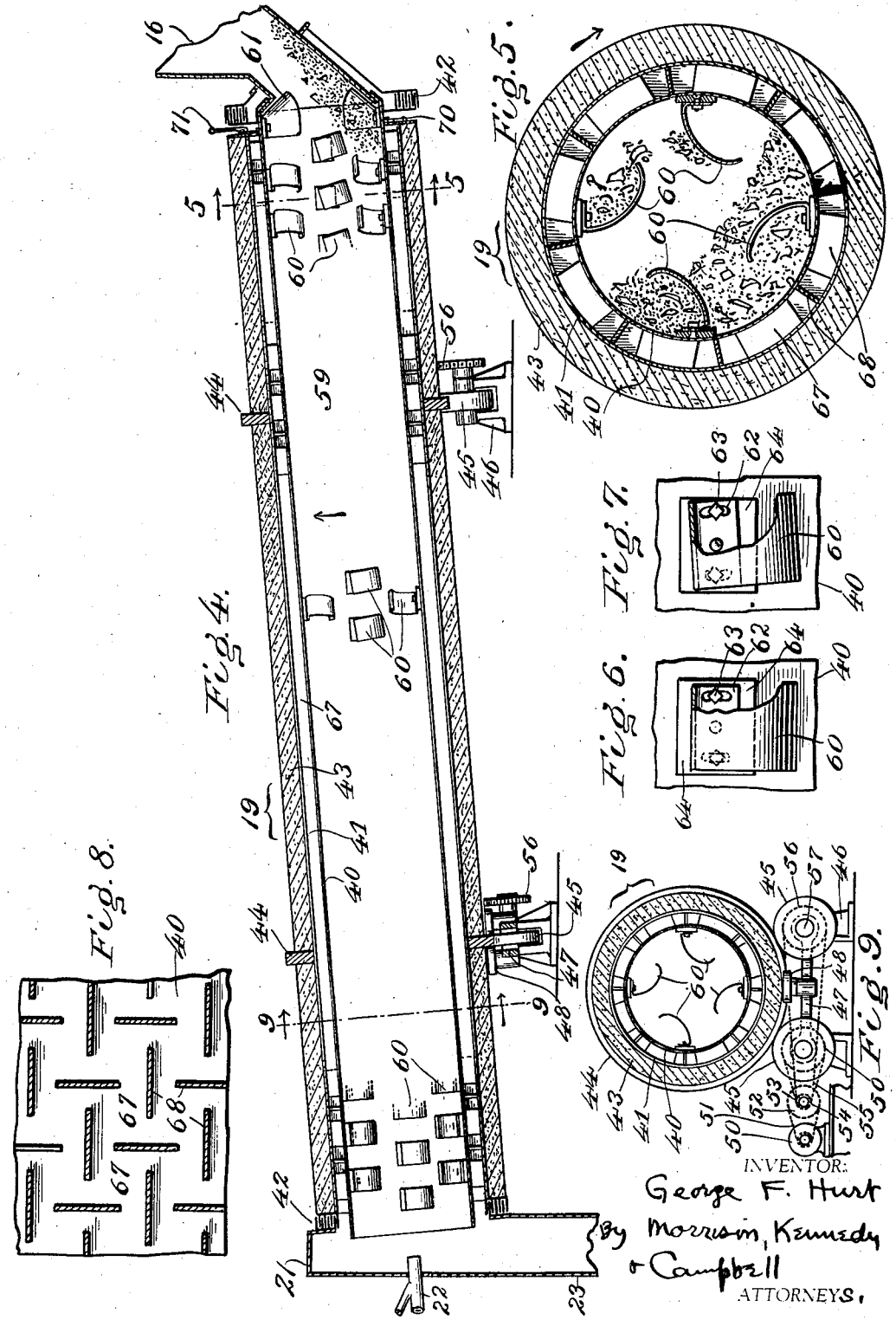

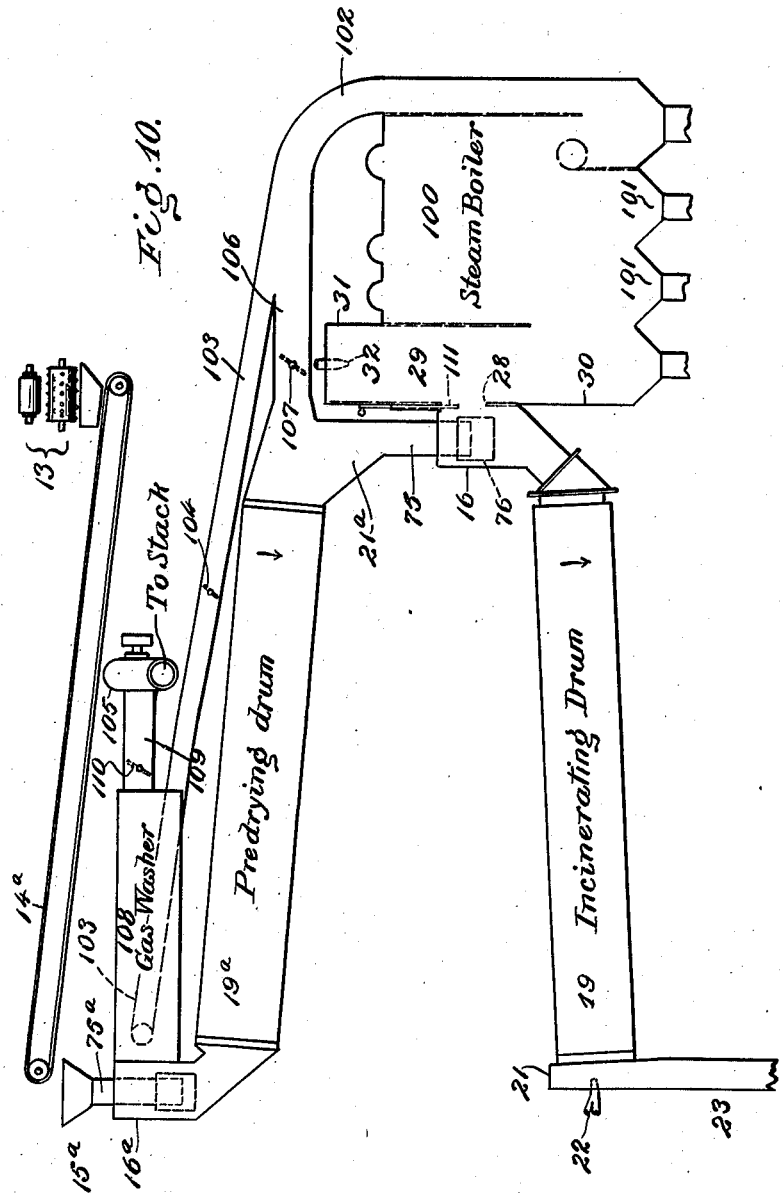

Patented Jan. 4, 1938

2,104,040

UNITED STATES PATENT OFFICE 2,104,040

REFUSE INCINERATION

George F. Hurt, New York, N. Y.

Application August 27, 1934, Serial No. 741,539

9 Claims. (Cl. 110—14)

This invention relates to refuse incineration, and refers more particularly to a method of treatment and an incineration plant adapted for the treatment of various kinds of refuse and mixtures including animal and vegetable matters in the form of garbage, rubbish etc., and typically represented by the waste matters handled by municipal destructor plants, wherein the combustible refuse to be treated is frequently mixed with a substantial percentage of non-combustible rubbish such as ashes, metal pieces and the like. It is assumed that as usual with this class of incineration plant all large pieces of metal or other rigid non-combustible waste material have been preliminarily extracted and the balance of the refuse has been disintegrated or cut down to a suitable size for effective handling and treatment.

The principal object of the invention is to afford a refuse incineration system of improved efficiency and thoroughness of incineration of organic matters, with large daily capacity and low cost of operation. A particular object is to afford an incineration plant and method wherein otherwise waste heat may be effectively utilized, as by the operation of a boiler, drying plant or the like. Further objects are to afford an improved furnace or chamber for the drying, burning and reducing to ashes of the refuse, and an improved regulatable infeed thereto. Further objects refer to the automatic control of certain of the actions involved in the system, also to the treatment of the outgoing gases passing to the boiler or other heat utilizing apparatus and therebeyond to avoid nuisance; and other advantages will be explained in the hereinafter following description or will be understood by those conversant with the subject.

To the accomplishment of the said objects and advantages the present invention consists in the novel refuse incineration plant and method, and the novel features of operation, apparatus, combination and arrangement herein illustrated or described.

In the accompanying drawings Figure 1 is what may be termed for convenience a front side elevation of a refuse incineration plant embodying the principles of the present invention, with the refuse infeed mechanism and certain other parts shown in longitudinal vertical section.

Fig. 2 is a left elevation of the infeed mechanism with a part of the casing broken away to show the interior construction.

Fig. 3 is a fragmentary perspective view of a short length of the rotary inner shell of the rotary furnace drum and an opposite pair of the refuse lifting and showering vanes therein, the two vanes shown being in separate flights or helical series.

Fig. 4 is a longitudinal central vertical section of the furnace drum shown in Fig. 1, with parts of its inlet and outlet heads.

Fig. 5 is a transverse section of the furnace drum of Figs. 1 and 4 taken for example on the line 5—5 of Fig. 4.

Fig. 6 is an inside elevation view of one of the refuse lifting vanes adjusted to neutral position, while Fig. 7 is a similar view showing the vane adjusted to a forward pitch tending to assist the progressing travel of the refuse longitudinally within the drum; these views showing the vanes traveling downward, looking toward the right side of Fig. 5.

Fig. 8 is a diagram or development showing the preferred arrangement of the baffles or ribs extending outwardly from the inner shell of the drum and occupying the annular space between the inner and outer shells.

Fig. 9 is a section similar to Fig. 5 but taken on the line 9—9 of Fig. 4 so as to show the driving or rotating connections for the drum and its supporting rollers.

Fig. 10 is a diagrammatic view showing the apparatus already described in combination with auxiliary apparatus.

Referring first to Fig. 1 the refuse may be carried and infed to the apparatus by a conveying belt 14 delivering into the funnel shaped hopper 15 located above the inlet head 16 of the incinerating furnace. The infeeding conveyor 14 may be suitably arranged in any conventional type of incinerating plant, having accommodations for the reception of refuse from motor trucks, the draining thereof, the removal of large rigid bodies that might choke the infeed, the reduction of the refuse to a proper size for infeed and incineration and the elevation of the thus prepared refuse and its supply to the conveyor 14.

The inlet head 16 is a closed and sealed casing, substantially air-tight, and preferably covered with insulation, as a layer of asbestos, and containing the infeed mechanism yet to be described. The bottom wall 17 of the head is steeply inclined to deliver the infed refuse to the inlet end of the drum. Near its upper end the inclined wall 17 has an observation window 18 of Pyrex glass permitting the attendant to inspect the infeeding operation and to effect control of infeed rate in case the infeed is at a rate too great or too small for the capacity of a furnace or drum, or for other purpose.

The rotary furnace or drum 19 will be further described in detail. It preferably slants slightly downwardly in the direction of the advance of the refuse, so that each portion of refuse is thus carried gradually from the inlet to the outlet end, the interior constituting a furnace, providing heat first for the drying of the refuse in the first portion or zone of its transit and thereafter the burning and final consumption of the refuse before discharge as ash or cinders from the outlet head 21. For these treatments of the refuse the outlet head is shown provided with a burner 22 for injecting fluent fuel, as oil or pulverized coal or gas, with primary air, thus firing the furnace with hot flames which travel counter to the refuse advance and effect in sequence the treatments described and to be hereinafter more fully explained. For convenience the fuel at burner 22 will be termed auxiliary fuel, the refuse itself being considered as a primary fuel, developing combustion heat. Preheated secondary air is supplied to the combustion point as will be more fully described.

Below the outlet head 21 is an ash chute 23 into which the head delivers and in which accumulate the ashes and other final incombustible solid residues from the furnace. In order to prevent undue admission of air through the chute 23 into the furnace the chute is shown as closed by a dumping gate or damper 24, which is normally held in closed position yieldingly as by a counterweighted lever 25. When the ashes have accumulated upon the gate 24 sufficiently to depress the gate, the latter is arranged to open widely and discharge completely the refuse and thereupon return to its fully closed position. To assist this operation a solenoid 26 or other motive device may be connected to swing wide open the gate, the solenoid being energized when the accumulations on the gate 24 are sufficient slightly to depress the latter, which may close an electric contact 27 to operate the solenoid, which thereupon is automatically deenergized that the counterweight 25 may restore the parts in readiness for another intermittent dumping operation, by closing the gate.

The hot gases leaving the rotary furnace by the inlet head 16 may pass eventually to a stack, but before discharge should be subject to further treatment, including completion of combustion of volatiles and other combustible ingredients in the outgoing gases. For this purpose a flue opening 28 is shown delivering from the inlet head 16 into a combustion chamber 29 enclosed within furnace walls 30. The combustion chamber 29 has an extension 31, for example upward, at the end of which is a fluent fuel burner 32 arranged to deliver what will be termed added fuel and primary air into the extension, and combine it with secondary air, to develop a high temperature by the complete combustion of the added fuel before the discharge through the opening 28 delivers the products from the rotary furnace to the combustion chamber, so that, in the presence of secondary air and uncombined primary air the residue combustible contents of the outgoing gases are completely burned and oxidized.

From the combustion chamber 29 is indicated an extension 34 through which the hot gaseous products may be delivered first to a heat recovery apparatus, such as a boiler, and from the outlet of the boiler to a gas washing or scrubbing apparatus, such as that shown in my Patent 1,708,179 of April 9, 1929 for the removal of moisture and soluble gases, and such solids as have not settled out at the combustion chamber, passing thence through a suction fan of controllable action or speed, delivering finally the cleaned and neutralized gaseous products for discharge from a stack.

A thermostat 37 may extend into the inlet head, as indicated at Fig. 2, with connections such that the temperature of the gases leaving the furnace chamber may control the feed of fuel to the burner 22, thus to keep a steady outgoing gas temperature. A pressurestat 38 is also indicated by which the operation of the subsequent suction fan may be regulated so as to preserve a substantially steady minus pressure in the inlet head.

The rotary drum or furnace 19 is shown as comprising primarily a shell 40 which will be termed the inner shell and which is composed preferably of a highly refractory alloy such as that known as "Allegheny 44", such as to withstand the temperatures involved without the need of clay or other refractory linings and therefore are able to transmit heat to the secondary air flowing along its exterior side as will be described. Spaced outwardly from the inner shell 40 is an outer casing or shell 41 which preferably rotates with the inner shell, the two together constituting a double-walled furnace drum. At the ends of the outer shell are air sealing packings 42 for example of labyrinth type, and similar packings may be elsewhere provided to prevent excessive admission of air to the furnace. Surrounding the outer shell 41 is shown a heat insulating layer 43, for example of asbestos or similar composition. Extending outwardly at spaced points of the outer shell are annular flanges or rails 44 serving to give support while permitting rotation of the drum. Underneath each of the supporting flanges 44 is a pair of supporting rolls 45, taking the weight of the drum and preferably being used also to transmit rotation thereto. Each pair of rolls 45 is shown supported on a pair of spaced apart supporting blocks 46, the spacing of which rolls may be varied for adjustment of the incline of the drum. Extending across both the blocks 46, at one end of the drum, is a fixed bracket 47 constituting a bearing support for a pair of positioning rollers 48 which engage the opposite sides of the drum flange 44 and hold the drum endwise in position.

The drum and its supporting rolls may be driven, preferably at a steady speed, by any suitable mechanism, such as the drive motor 50 which through a sprocket chain 51 turns a sprocket wheel 52 on a long shaft 53 extending to points opposite both pairs of supporting rolls. On the shaft 53 are a number of pinions 54, for example one for each of the rolls 45, and these pinions are connected by sprocket chains 55 to sprocket wheels 56 on the shafts 57 of the rolls 45. By this arrangement the entire system is rotated uniformly.

Within the main or inner shell 40 is the furnace chamber 59 through which the refuse progresses from the higher or inlet end to the lower or outlet end. To produce better contact between the hot gases flowing uphill and the refuse flowing downhill, the inner shell is shown as provided with a number of curved vanes or buckets 60 operating in the chamber 59 to lift portions of the refuse to a high point, and shower them down through the chamber space, as roughly illustrated in Fig. 5. The refuse is not merely tumbled but is lifted and poured across the space through which the gases are traveling. As indicated in Fig. 4 the vanes 60 are shown arranged in opposite pairs, and the first pair of vanes 61 is extended toward the refuse inlet in the form of scoops, to scoop out from the inlet portions of refuse and start them on their travel through the drum. The refuse lifting and showering means obviously could be placed on an interior actuator or shaft and so operated independently of the drum's rotation.

Fig. 4 shows also that the several vanes are preferably given a forward pitch to promote the travel of the refuse lengthwise within the furnace chamber 59. The mounting is shown also in Figs. 5, 6 and 7. Each vane has a flat flange or foot 62 and this is centrally pivoted on a flat mounting or surface 64 at the inner side of the shell. A slot and screw connection 63 serves to hold the inclined adjustment or pitch, as seen by comparing Fig. 6 where the pitch is zero and Fig. 7 where there is several degrees of incline. As indicated in Fig. 4 the pitch of the vanes 60 is preferably greater at the earlier or upper portion of the chamber, the pitch being less near the central portion or zone and reduced substantially to zero at the lower portion near the outlet. This arrangement is because of the shrinkage of volume of refuse in traversing the chamber. As the volume decreases it is desired to slow down the speed of advance, thus prolonging the period of travel of each portion of refuse without congesting the furnace at any part of its length.

The spacing of the inner and outer shells 40 and 41 provides an annular flue 67 which is of operative importance in several aspects. The outer shell 41 and the flue 67 preferably extend the full length of the rotary drum, although the flue might commence at an intermediate point; and in any case the direction of air travel through the flue is in the same downward or progressing direction as the advance of the refuse. Thus air passes through the flue part surrounding the drying zone in the furnace chamber and thence surrounding the hotter burning zone at the middle of the length of the drum and finally surrounding the last zone, which will be termed the deadroasting zone, within which the highest temperatures prevail, the air thence traveling from the annular flue around into the outlet head and back into the deadroasting zone of the chamber 59, this highly preheated secondary air being met by the injected fuel and primary air and taking part in high temperature combustion.

By the described arrangement the air traveling through the annular flue 67 is advantageously preheated as described; this flow of air outside the metal shell 40 counter to the direction of flow of the gases through the chamber 59 effects a useful cooling of the shell 40 and thereby protects it against overheating and prolongs its life, permitting dispensing with a clay refractory lining thereto; being all metal the shell 40 more effectively transmits heat from the furnace chamber 59 into the annular flue 67. Preferably the heat transmission through the inner shell 40 to the air traveling through the annular flue is improved by the formation at the outer side of the shell 40 of a system of projections or ribs 68, which may be formed or welded upon the shell and which conduct the heat rapidly into contact with the traveling air. Such ribs or projections 68 serve also certain other important advantages. Thus, by arranging the ribs 68 in the form of baffles as indicated in Fig. 5, and shown at occasional points in Fig. 4, with a preferred arrangement such as that shown in Fig. 8, the path of travel of the air is prolonged and the air is caused to sweep effectively into heat-receiving contact with the ribs. Additionally, by extending the ribs clear across the annular flue 67 they serve as spacing means and as braces as between the shells, rigidifying the structure of the drum as a whole. The baffle system extends the full length of flue 67.

Suitable damper means may be employed for controlling the rate of air flow through the preheating channel 67. A convenient form of damper is a damper 70 of the rotary type, as indicated at Figs. 1 and 4, consisting of a pair of apertured annular plates, both rotating with the drum 19 and one of them being rotatable relatively to the other, at will, by means of an adjusting handle 71. By the use of this damper the proportion of preheated secondary air fed to the combustion point may be regulated to suit conditions.

Referring finally to the infeed mechanism the receiving hopper 15 is shown as extended downwardly as a chute 75, preferably of rectangular section, enclosed within the inlet head 16. For infeed adjustment purposes the chute 75 is shown as of a telescoping construction, there being a sliding section 76 surrounding the fixed section of the chute. For adjusting the chute section or sleeve 76 with relation to the oscillating tray 85 to be described there is shown a forked lever 77 having its inner end pivoted to the opposite sides of the adjusting sleeve 76, the lever being pivoted to the inlet head and having an outwardly extending handle 78 and a counterweight 79 to offset the weight of the sleeve. Vertical adjustment of the handle sets the sleeve as desired, and to hold any particular adjustment there is shown provided a notched segment 80 engageable by a dog controlled by a locking lever 81.

Below the chute 75, 76 is shown a swingable or oscillating member in the form of a tray or pan 85, having a central position as shown in full lines in Fig. 2 directly beneath the chute but being adapted to be swung laterally in both directions, one extreme position being shown in dotted lines in Fig. 2. The tray is composed of a bottom plate 86 which may be flat or dished, and upright side walls 87 sliding closely against the outer sides of the chute sleeve 76, the tray or pan being open-ended at both ends, so that at the end of each oscillation it may spill the refuse which has been received upon it from the chute, without allowing free discharge from the chute.

In order to effect methodical oscillating or intermediate dumping movements of the chute and tray the latter is shown as having projecting at each lateral side a pin 91, these pins being engaged by a pair of vertically slotted plates 92 upstanding from a sliding bar 93 mounted in fixed bearings 94 at the sides of the inlet head; the slide being connected by a link 95 to a crank 96 turned preferably uniformly through reduction gearing 97 from a driving motor 98, with which may be associated any suitable means for altering or adjusting the rate of action of the infeed mechanism.

As a practical instance the following illustrative data may be given. The rotary drum may be 60 feet long more or less, with an internal diameter of 5 feet and an enclosed volume of about 1200 cubic feet. The inner shell may be of heat resisting alloy ⅜ inch thick, while the outer shell may be twice that thickness, leaving an 8 inch flue between and externally covered by a 12 inch layer of asbestos. In practice the infeed of refuse should be restricted, so that the hot gases traversing the furnace may occupy between 70% and 80% more or less of the chamber volume.

The inner shell constitutes an elongated rotating tubular furnace containing means for transversely showering the refuse traversing it, preferably by the rotation of the shell, which may be at a speed in the neighborhood of 15 rotations per minute. The refuse infeed and travel may be at such rate, for example that through the drying zone the advance is at the rate of 6 feet per minute more or less, the travel however slowing down beyond the drying zone, as described, so that each portion of refuse may require 15 minutes more or less for the complete traverse of the 60 feet of furnace length.

The described infeed device may be operated with a crank rotation of one turn per minute, resulting in the dumping of a batch of refuse from the infeed to the furnace every 30 seconds, each batch varying for example from zero to 100 cubic feet in volume, according to adjustment, made under observation during operation. With an average infeed of say 40 cubic feet per minute the apparatus would handle something over 500 tons of refuse per day of 24 hours.

The secondary air descending through annular flue 67 may receive a preheat temperature of 800° to 1000° F. more or less. The flames delivered into the rotary furnace by the burner 22 may have a temperature of 1800 to 2000°, the solid residues of the refuse having their final treatment at this temperature. The gas temperatures may drop progressively, although somewhat maintained by the combustion of refuse itself, reaching the inlet head at a temperature in the neighborhood of 1600°, this being again elevated at the combustion chamber by the added fuel and completion of combustion, for example to 2200°, suitable for the operation of a boiler; and beyond the boiler the temperatures fall off rapidly to those suitable for passage of the suction fan and discharge at the stack.

The method has been substantially indicated, involving the continuous incineration of refuse, and may be summed up as comprising the feeding of the refuse to an elongated tubular chamber and advancing it longitudinally while transversely showering it therein; burning auxiliary fuel at the chamber outlet and passing the hot gases through the chamber, whereby the refuse first has its moisture and volatiles driven off in the drying zone, the refuse being then consumed in the burning zone by direct contact with the hot gases and finally deadroasted or subjected to the direct high temperature of the flames and thus converted into ash or cinders for discharge at the outlet end; and during these operations causing combustion air to flow in external contact with the chamber at the drying and burning zones for the preheating of the air and for discharge thence into the chamber outlet to take part in the fuel combustion; the gases issuing from the drying zone being then treated by reheating to cause combustion of volatiles and other combustibles. At the combustion chamber additional fuel and air are injected not merely for completing combustion but for maintaining temperature, under control, to permit useful heat recovery, as by a boiler.

In Fig. 10 there is shown the rotary incinerating drum or furnace 19 in combination with associated elements of a plant. Thus a heat recovery apparatus is indicated in the form of a steam boiler 100 from which some of the ash and dust may be removed by usual ash pits 101. The exit flue 102 of the boiler is shown as branched. What will be termed the by-pass flue 103, controlled by damper 104, extends directly to the gas washer 108 which delivers to the stack. The other branch 106 controlled by damper 107 is shown as extending through the outlet head 21ª of a second rotary drum or drier 19ª wherein garbage or other wet materials may be dried before being fed through chute 75 into the inlet head 16 of the incinerating drum 19. The drum 19ª may be substantially a counterpart of the other as to its mountings, interior vanes etc. but may consist of only a single shell since the predrying operations in drum 19ª do not require very high temperatures.

Fig. 10 indicates a refuse disintegrating element 13 delivering the refuse, reduced in size, upon the conveyor 14ª, in the form of a belt or other conveyor form. This conveyor delivers into the hopper 15ª of the inlet head 16ª of the predrying drum 19ª, with controlled infeeding mechanism within the head 16ª analogous to that described in relation to head 16.

The garbage thus infed to the predrying drum 19ª travels progressively through it while being dried, and is thus infed into the incinerating drum 19, while the hot furnace gases traveling through flue 106 and drum 19ª remove the major part of the moisture from the refuse.

From the inlet head 16ª of the predrying drum the gases are shown as passed directly into a gas washing or scrubbing apparatus 108, such as already mentioned, from which they pass through a flue 109 controlled by damper 110, and leading to the fan 105.

In operation, the predrying drum may be supplied with gases, for example at 350° F. The green garbage is thus subjected to a very effective drying operation, which might be supplemented by a fluent fuel burner. Whereas initially the major part of the refuse may consist of moisture, the predrying treatment may reduce the moisture to a very minor part. By this improvement the thermal work of the plant is greatly reduced, and extensive economies are effected not only in this way but otherwise. Thus the water content of the refuse being reduced this reduces the quantity of auxiliary fuel required at the burner 22 of the incinerating drum. The gases passing from the inlet chamber 16 to the combustion chamber 29 and thence to the boiler have a much reduced moisture content, which saves additional fuel at the burner 32 and reduces the need of excess air to the boiler 101. When the drum 19 is in normal operation the by-pass 103 should be closed. When no drying in drum 19ª is necessary the flue 106 may be closed and flue 103 opened. When neither drum is in operation a damper 111 between the inlet 16 and the combustion chamber 29, may be closed and the boiler operated from the burner 32. The use of a predrying chamber in advance of the incinerating drum is of substantial value in that, within the incinerating drum, the first or drying zone becomes materially shortened, the burning and deadroasting zones thereby becoming relatively lengthened and rendered more complete in their operative results, and their capacity increased.

When the refuse is passed through a predrying stage before entering into the incinerating drum, for example, as in Fig. 10, it is manifest that the hot gases which effect the drying in the predrying drum will leave that drum containing noxious ingredients and offensive odors. It is important that these be destroyed or neutralized before final release. This is readily accomplished in the disclosed apparatus through treatment of such gases in the gas-washing or scrubbing unit 108. This, as before stated, may be similar to my prior Patent No. 1,708,179, wherein the treating liquids are sprayed upwardly or fountained in a manner to traverse the gas passage for thorough contact and interaction between the liquids and gases. It is, therefore, only necessary to add to the scrubbing water or liquid suitable reagents tending to destroy or neutralize the noxious gases. In some cases, milk of lime may be sufficient; but in other cases, more powerful reagents may be expedient, according to the conditions presented.

There has thus been described a refuse incineration plant or apparatus, and method of treatment, embodying the principles of the invention; but as many features of operation, apparatus, combination and arrangement may be variously modified without departing from the principles of the invention, it is not intended to limit the invention to such features except to the extent set forth in the appended claims.

I claim:

1. In refuse incineration apparatus, an elongated rotary drum enclosing a furnace chamber through which the refuse progresses gradually from the inlet end to the outlet end during its treatment, a fuel injecting burner directed into the outlet end of the drum for combustion of auxiliary fuel when required to provide high temperature in the chamber, thereby to cause the burning of the refuse and driving of gasifiable components therefrom, and the drying of the refuse, as the combustion gases traverse the furnace chamber counter to the progress of the refuse, means for maintaining flow of the gases through the furnace chamber, a combustion chamber to which the gaseous products flow from the furnace chamber inlet, a burner for introducing fuel and air to the combustion chamber adapted to maintain therein combustion temperatures to consume unburned gaseous products received from the furnace chamber, a predrying drum delivering refuse to the incinerating drum, and flues for passing the gases from the incinerator drum to the predrying drum for flow therethrough, a gas washer beyond the predrying drum, and a flue to by-pass around the predrying drum.

2. In refuse incineration apparatus, an elongated rotary drum enclosing a furnace chamber through which the refuse progresses gradually from the inlet end to the outlet end during its treatment, a fuel injecting burner directed into the outlet end of the drum for combustion of auxiliary fuel when required to provide high temperature in the chamber, thereby to cause the burning of the refuse and driving of gasifiable constituents therefrom, as the combustion gases traverse the furnace chamber counter to the progress of the refuse, a combustion chamber to which the gaseous products flow from the furnace chamber inlet, a burner for the controlled introduction of fuel and air to the combustion chamber adapted to maintain therein combustion temperatures to consume unburned gaseous products received from the furnace chamber, a waste heat utilizing apparatus receiving and being operated by the hot products of combustion from the combustion chamber, a predrying drum delivering refuse to the incinerating drum, and flues for passing the gases from the waste heat utilizing apparatus to the predrying drum for flow therethrough.

3. In refuse incineration apparatus, an elongated rotary drum enclosing a furnace chamber through which the refuse progresses gradually from the inlet end to the outlet end during its treatment, a fuel injecting burner directed into the outlet end of the drum for combustion of auxiliary fuel when required to provide high temperature is maintained in the chamber, thereby to cause the burning of the refuse and driving of gasifiable components therefrom, as the combustion gases traverse the furnace chamber counter to the progress of the refuse, a combustion chamber to which the gaseous products flow from the furnace chamber inlet, a burner for the controlled introduction of fuel and air to the combustion chamber adapted to maintain therein combustion temperatures to consume unburned gaseous products received from the furnace chamber, a waste heat utilizing boiler receiving and being operated by the hot products of combustion from the combustion chamber, a predrying drum delivering refuse to the incinerating drum, and flue means for passing gases from the boiler to the predrying drum for flow therethrough, a gas washer beyond the predrying drum, a suction fan beyond the washer, and a flue to by-pass around the predrying drum.

4. Apparatus as in claim 1 and wherein the means for maintaining flow of the gases comprises a suction fan beyond the washer.

5. In refuse incineration apparatus, an elongated rotary drum enclosing a furnace chamber through which the refuse progresses gradually from the inlet end to the outlet end during its treatment, a fuel injecting burner directed into the outlet end of the drum for combustion of auxiliary fuel when required to provide high temperature in the chamber, thereby to cause the burning of the refuse and driving of gasifiable components therefrom, and the drying of the refuse, as the combustion gases traverse the furnace chamber counter to the progress of the refuse, means for maintaining flow of the gases through the furnace chamber, a combustion chamber to which the gaseous products flow from the furnace chamber inlet, a burner for introducing fuel and air to the combustion chamber adapted to maintain therein combustion temperatures to consume unburned gaseous products received from the furnace chamber, a predrying drum delivering refuse to the incinerating drum, and flues for passing the gases from the incinerator drum to the predrying drum for flow therethrough.

6. In refuse incineration apparatus, an elongated rotary drum enclosing a furnace chamber through which the refuse progresses gradually from the inlet end to the outlet end during its treatment, a fuel injecting burner directed into the outlet end of the drum for combustion of auxiliary fuel when required to provide high temperature in the chamber, thereby to cause the burning of the refuse and driving of gasifiable constituents therefrom, as the combustion gases traverse the furnace chamber counter to the progress of the refuse, a combustion chamber to which the gaseous products flow from the furnace chamber inlet, a burner for the controlled introduction of fuel and air to the combustion chamber adapted to maintain therein combustion temperatures to consume unburned gaseous products received from the furnace chamber, a waste heat utilizing apparatus receiving and being operated by the hot products of combustion from the combustion chamber, a predrying drum delivering refuse to the incinerating drum, a gas washer beyond and connected with the predrying drum, and flues for passing the gases from the waste heat utilizing apparatus to the gas washer for flow therethrough.

7. In refuse incineration apparatus, an elongated rotary drum enclosing a furnace chamber through which the refuse progresses gradually from the inlet end to the outlet end during its treatment, a fuel injecting burner directed into the outlet end of the drum for combustion of auxiliary fuel when required to provide high temperature in the chamber, thereby to cause the burning of the refuse and driving of gasifiable components therefrom, as the combustion gases traverse the furnace chamber counter to the progress of the refuse, a combustion chamber to which the gaseous products flow from the furnace chamber inlet, a burner for the controlled introduction of fuel and air to the combustion chamber adapted to maintain therein combustion temperatures to consume unburned gaseous products received from the furnace chamber, a waste heat utilizing boiler receiving and being operated by the hot products of combustion from the combustion chamber, a predrying drum delivering refuse to the incinerating drum, and flue means for passing gases from the boiler to the predrying drum for flow therethrough.

8. In refuse incineration apparatus, a main rotary drum enclosing a combustion chamber through which the refuse progresses gradually from the inlet end to the outlet end, a regulable fuel injecting burner directed into the outlet end of the main drum, a sealed inlet head to said main drum arranged to deliver refuse to its inlet end, and to receive gases and vapors from the drum and deliver such gases and vapors through an outlet, and refuse infeed mechanism enclosed in said inlet head and comprising a refuse chute entering the head from above, a shiftable member below the chute taking the weight of the refuse and restraining free downflow, and means to shift said member for releasing a batch of refuse and delivering it into the drum and to restore it to restrain downflow, a drying drum arranged to deliver refuse to the infeed chute, and flues from said gas and vapor outlet for delivering the hot gases to and through said drying drum without traversing such infeed chute.

9. In refuse incineration apparatus, an elongated rotary furnace drum enclosing a furnace chamber through which the refuse progresses gradually from the inlet end to the outlet end during its treatment, a fuel injecting burner directed into the outlet end of the drum for combustion of auxiliary fuel when required to provide high temperature in the chamber, thereby to cause the burning of the refuse and the driving of gasifiable constituents therefrom, as the combustion gases traverse the furnace chamber counter to the progress of the refuse, means for maintaining forced flow of the gases through the furnace chamber, an offset combustion chamber and a by-passage from the furnace chamber refuse inlet to the combustion chamber by which the gaseous products are diverted from the refuse inlet path, a predrying drum having a passage delivering refuse to the incinerating drum, and flues whereby the hot gases are passed from the combustion chamber to the predrying drum for flow therethrough.

GEORGE F. HURT.